No. 729,714. Patented June 2, 1903.

UNITED STATES PATENT OFFICE.

THOMAS V. ALLIS, OF BRIDGEPORT, CONNECTICUT.

PROCESS OF MANUFACTURING METAL SHEETS.

SPECIFICATION forming part of Letters Patent No. 729,714, dated June 2, 1903.

Original application filed December 24, 1901, Serial No. 87,107. Divided and this application filed December 3, 1902. Serial No. 133,765. (No specimens.)

*To all whom it may concern:*

Be it known that I, THOMAS V. ALLIS, a citizen of the United States, residing at Bridgeport, in the county of Fairfield and State of Connecticut, have invented certain new and useful Improvements in Processes of Manufacturing Metal Sheets, of which the following is a specification.

This invention relates to the art of manufacturing metal sheets by hot-rolling metal plates arranged in a pack.

The invention is based upon the discovery that certain silicates having the properties and characteristics hereinafter more fully set forth when properly treated and applied to the surfaces of metal plates prevents undue adhesion of the same during the reducing process, while at the same time it does not prevent that degree of adhesion or contact which is necessary to the coincident and uniform elongation of the plates in "pack" when acted upon by compression. Furthermore, the sheets when completed can be freed from scale by the ordinary pickling-acids.

The material to fulfil the requirements of my invention must have the following properties and characteristics: first, of being refractory and capable of resisting the action of the heat to which the metal is subjected in the furnace; second, it must be capable of being finely comminuted or ground into an impalpable powder in order that it may be applied to the surfaces of the plates in a very thin adherent layer; third, its properties must be such that while not preventing the plates in pack from adhering to a sufficient degree to cause them to draw out or elongate uniformly in reduction it will prevent such permanent adhesion of the plates in pack as will render it difficult or impossible to separate them when necessary; fourth, its properties and characteristics must be such that when the sheets are reduced to the desired thickness they may be pickled and freed from scale in the ordinary acid-bath, whereby said sheets are given clean metallic surfaces suitable for tinning or other purposes. After very many experiments and careful study and investigation I have discovered that soapstone embodies all of the properties and characteristics necessary to fulfil the requirements hereinbefore recited.

In practicing my invention I first coat the surfaces of the plates in any suitable manner, as by dusting or blowing the finely comminuted or powdered soapstone upon them or by passing the plates through a body of the same contained in a suitable receptacle, in which case a sufficient quantity of the soapstone will adhere to the surfaces of the plate to perform the function required of it. In lieu of applying the soapstone in powdered form and in the manner described it may be mixed with a solution of glue and water, the resultant body being about the consistency of paint, and the plates are then suitably coated by dipping or by the use of a brush. When a sufficient number of plates have been thus coated, they are piled into a pack, being preferably fastened together at one end of the pack to prevent them from subsequently shifting upon each other and to preserve the thin even coating on their contact-surfaces. The packs are then heated to a cherry-red and may be rolled to a finish at one heat, care being taken to avoid separating the plates to disturb the coating or admit air between the plates until their reduction is completed. By excluding air from between the plates during reduction further oxidation of the metal is prevented. When cold, the packs may be sheared to sheets of the desired size and the sheets separated. These sheets may then be carried through any of the usual processes employed in the working of or treatment of sheet metal.

I desire to call particular attention to the fact that as my invention renders it unnecessary to open or separate the plates in pack after each time they are reduced, as now practiced, therefore the plates are not subjected to the cooling action which results from their contact with air, and hence in practicing my invention it will be readily seen that the process of reducing the plates to sheets of the desired thickness may be accomplished, when desired, at a single heat, and consequently more expeditiously and economically.

While I have found that soapstone, which is readily obtainable and is of low cost, is preferably used, it will be understood that in practicing my invention I do not wish to be limited to the use of such material, but that I may use any other material having the described and necessary properties and characteristics. I therefore desire it to be understood that in employing the term "soapstone" in my claim I intend and mean any other material having substantially the herein-described properties and characteristics of soapstone and which is capable of producing like results in the particular art to which my invention relates.

This application being a division of another application filed by me December 24, 1901, Serial No. 87,107, wherein is recited the use of materials other than soapstone or its equivalent and particular methods of treatment, I do not herein claim such other described materials or methods of treatment; but, Having described my present invention, so that those skilled in the art may be able to practice the same, what I claim, and desire to secure by Letters Patent, is—

The process of producing metal sheets in "pack" which consists in superposing upon the contact-surfaces of metal plates or sheets in "pack," a coating of finely-comminuted soapstone and subjecting the "pack" to heat and pressure and thereby reducing the plates therein to sheets as described and set forth.

In testimony whereof I affix my signature in presence of two witnesses.

THOMAS V. ALLIS.

Witnesses:
EUGENE A. BYRNES,
C. A. NEALE.